United States Patent [19]
Felts et al.

[11] Patent Number: 5,863,237
[45] Date of Patent: Jan. 26, 1999

[54] LOW SPEED BURNISHING OF ASPERITIES IN A DISC DRIVE

[75] Inventors: Wayne L. Felts, Oklahoma City; Christopher A. Kastl, Yukon; Rafael Eduardo Gutierrez, Edmond, all of Okla.

[73] Assignee: Seagate Technology, Inc., Scotts Valley, Calif.

[21] Appl. No.: 760,388

[22] Filed: Dec. 4, 1996

[51] Int. Cl.⁶ ............................. B24B 39/06; G11B 15/46
[52] U.S. Cl. ......................... 451/41; 451/312; 451/319; 451/324; 360/103; 360/106; 73/105
[58] Field of Search ................................. 451/41, 58, 63, 451/312, 319, 324; 360/103–106; 73/105; 29/90.01

[56] References Cited

U.S. PATENT DOCUMENTS

| | | | |
|---|---|---|---|
| 4,674,875 | 6/1987 | Koizumi | 356/237 |
| 4,881,136 | 11/1989 | Shiraishi et al. | 360/25 |
| 4,931,338 | 6/1990 | Toffle | 428/65 |
| 5,063,712 | 11/1991 | Hamilton et al. | 51/67 |
| 5,410,439 | 4/1995 | Egbert et al. | 360/75 |
| 5,412,519 | 5/1995 | Buettner et al. | 360/73.03 |
| 5,423,111 | 6/1995 | Mori | 29/90.01 |
| 5,527,110 | 6/1996 | Abraham et al. | 374/5 |
| 5,528,922 | 6/1996 | Baumgart et al. | 73/1 |
| 5,658,191 | 8/1997 | Brezoczky | 451/324 |
| 5,659,447 | 8/1997 | Gregory et al. | 360/103 |
| 5,689,064 | 11/1997 | Kennedy et al. | |

*Primary Examiner*—Eileen P. Morgan
*Attorney, Agent, or Firm*—Westman, Champlin & Kelly, P.A.

[57] ABSTRACT

A method of and apparatus for burnishing a surface of a magnetic disc of a disc drive are disclosed. The disc drive has a data head and an actuator supporting the head as the head flies above the surface of the disc. A controller causes the disc to be rotated at rates of rotation which will result in burnishing head fly heights which are less than a normal operational fly height of the head. An actuator controller controls the actuator to repeatedly move the head across a region of the disc during a burnishing time period. The head flies above the surface of the disc at the burnishing fly heights during the burnishing time period to thereby reduce asperities on the disc.

16 Claims, 12 Drawing Sheets

HDA #1: EFFECT OF BURNISHING ON 21 TA'S

| TA TYPE | REDUCTION IN TA'S | TA CHANGE | TOTAL # TA'S | AFTER 15 MIN. | AFTER 30 MIN. | AFTER 45 MIN. |
|---|---|---|---|---|---|---|
| 2 | 50% FOR TYPE 2 | ELIMINATED | 5 | 2 | 2 | 1 |
| | | CONVERTED TO TYPE 1 | 2 | 1 | | 1 |
| | | NO CHANGE | 1 | | | |
| | | INTERMITTENT | 0 | | | |
| | | ADDED | 1 | 1 | | |
| | | NET ACCUM. REDUCTION : | - | 12% | 37% | 50% |
| 1 | 77% FOR TYPE 1 | ELIMINATED | 10 | 6 | 4 | |
| | | NO CHANGE | 0 | | | |
| | | INTERMITTENT | 3 | | | |
| | | ADDED | 0 | | | |
| | | NET ACCUM. REDUCTION : | - | 46% | 77% | 77% |
| 1&2 | 67% OVERALL | NET ACCUM. REDUCTION : | - | 33% | 62% | 67% |

TABLE 1

Fig. 6

HDA #2: EFFECT OF BURNISHING ON 5 TA'S

| TA TYPE | REDUCTION IN TA'S | TA CHANGE | TOTAL # TA'S | AFTER 30 MIN. | AFTER 60 MIN. |
|---|---|---|---|---|---|
| 2 | 0% FOR TYPE 2 | ELIMINATED | 0 | | |
| | | CONVERTED TO TYPE 1 | 1 | | 1 |
| | | NO CHANGE | 2 | | |
| | | INTERMITTENT | 0 | | |
| | | ADDED | 0 | | |
| | | NET ACCUM. REDUCTION: | - | 0% | 0% |
| 1 | 50% FOR TYPE 1 | ELIMINATED | 1 | 1 | |
| | | NO CHANGE | 1 | | |
| | | INTERMITTENT | 0 | | |
| | | ADDED | 0 | | |
| | | NET ACCUM. REDUCTION: | - | 50% | 50% |
| 1&2 | 20% OVERALL | NET ACCUM. REDUCTION: | - | 50% | 50% |

TABLE 2

*Fig. 7*

HDA #3: EFFECT OF BURNISHING ON 18 TA'S

| TA TYPE | REDUCTION IN TA'S | TA CHANGE | TOTAL # TA'S | AFTER 30 MIN. | AFTER 60 MIN. |
|---|---|---|---|---|---|
| 2 | 75% FOR TYPE 2 | ELIMINATED | 3 | 1 | 2 |
| | | CONVERTED TO TYPE 1 | 1 | 1 | |
| | | NO CHANGE | 0 | | |
| | | INTERMITTENT | 0 | | |
| | | ADDED | 0 | | |
| | | NET ACCUM. REDUCTION: | - | 25% | 75% |
| 1 | 50% FOR TYPE 1 | ELIMINATED | 12 | 11 | 1 |
| | | NO CHANGE | 2 | | |
| | | INTERMITTENT | 0 | | |
| | | ADDED | 0 | | |
| | | NET ACCUM. REDUCTION: | - | 79% | 86% |
| 1&2 | 67% OVERALL | NET ACCUM. REDUCTION: | - | 67% | 83% |

TABLE 3

HDA #4: EFFECT ON BURNISHING ON 139+ TA'S

| TA TYPO | REDUCTION IN TA'S | TA CHANGE | TOATAL # TA'S | AFTER 15 MIN. | AFTER 30 MIN. | AFTER 45 MIN. | AFTER 60 MIN. |
|---|---|---|---|---|---|---|---|
| 1 & 2 | 0.7% OVERALL | ELIMINATED | 30 | 16 | 3 | | 3 |
| | | NO CHANGE | 31 | | | | 31 |
| | | INTERMITTENT | 78 | | | | |
| | | ADDED | 29 | | | | |

TABLE 4

Fig. 8

| | INWARD ACTUATOR VELOCITY (IPS) | SPINDLE SPEED START (RPM) | SPINDLE SPEED END (RPM) | OUTWARD ACTUATOR VELOCITY (IPS) | LINEAR VELOCITY AT START (IPS) | LINEAR VELOCITY AT END (IPS) |
|---|---|---|---|---|---|---|
| MINIMUM | 1.73 | 869.44 | 1939.04 | 4.72 | 164.44 | 159.42 |
| MAXIMUM | 1.96 | 873.09 | 2078.48 | 4.97 | 165.13 | 170.88 |
| AVERAGE | 1.88 | 871.04 | 1989.91 | 4.85 | 164.74 | 163.60 |

TABLE 10

SPINDLE SPEED DURING ONE LOW SPEED BURNISHING SWEEP FROM OD TO ID COMPARED TO SPEED REQUIRED FOR 165 IPS HEAD LINEAR VELOCITY

LOW SPEED BURNISHING OF ASPERITIES IN A DISC DRIVE

BACKGROUND OF THE INVENTION

The present invention relates to magnetic disc drive data storage devices and, more particularly, to a method of reducing or eliminating asperities on a disc surface.

In disc drive data storage devices, digital data are written to and read from a thin layer of magnetizable material on a surface of one or more rotating discs. Write and read operations are performed through a transducer which is carried in a slider body. The slider and transducer are sometimes collectively referred to as a head, and typically a single head is associated with each disc surface. The heads are selectively moved under the control of electronic circuitry to any one of a plurality of circular, concentric data tracks on the disc surface by an actuator device. Each slider body includes an air bearing surface (ABS). As the disc rotates, the disc drags air beneath the ABS, which develops a lifting force that causes the head to lift and fly several microinches above the disc surface.

In operation, the magnetic head can come into contact with asperities on the surface of the disc while the head flies above the surface of the disc. Potentially, this undesirable contact can cause data written to a particular location on the disc to be lost. Immediately after contact with an asperity, the heat generated by the contact changes the resistive properties of the magnetoresistive (MR) head. As a result, the corresponding signal read by the MR head is distorted by a voltage spike and subsequent decay, sometimes causing the data stored near the asperity to be unrecoverable. The voltage spike in the read signal is frequently referred to as a "thermal asperity," while the feature on the disc is referred to as an "asperity". However, since one is indicative of the other, the two terms are frequently used interchangeably.

Disc asperities which are located in the factory during the defect scanning process can be recorded in the disc drive's primary defect list, so that the drive does not store data at those locations. However, it is preferable to reduce the number of asperities on the surface of the disc in order to maximize available storage space and to minimize head-to-asperity contact during operation. Consequently, an improved method of reducing the size and/or number of asperities on the surface of the disc would be a significant development in the field.

SUMMARY OF THE INVENTION

A method of and apparatus for burnishing a surface of a magnetic disc of a disc drive are disclosed. The disc drive has a data head and an actuator supporting the head as the head flies above the surface of the disc. A controller causes the disc to be rotated at rates of rotation which will result in burnishing head fly heights which are less than a normal operational fly height of the head. An actuator controller controls the actuator to repeatedly move the head across a region of the disc in a generally radial direction during a burnishing time period. The head flies above the surface of the disc at the burnishing fly heights during the burnishing time period to thereby reduce asperities on the disc.

DETAILED DESCRIPTION OF THE PREFERRED EMBODIMENTS

Figure 1:
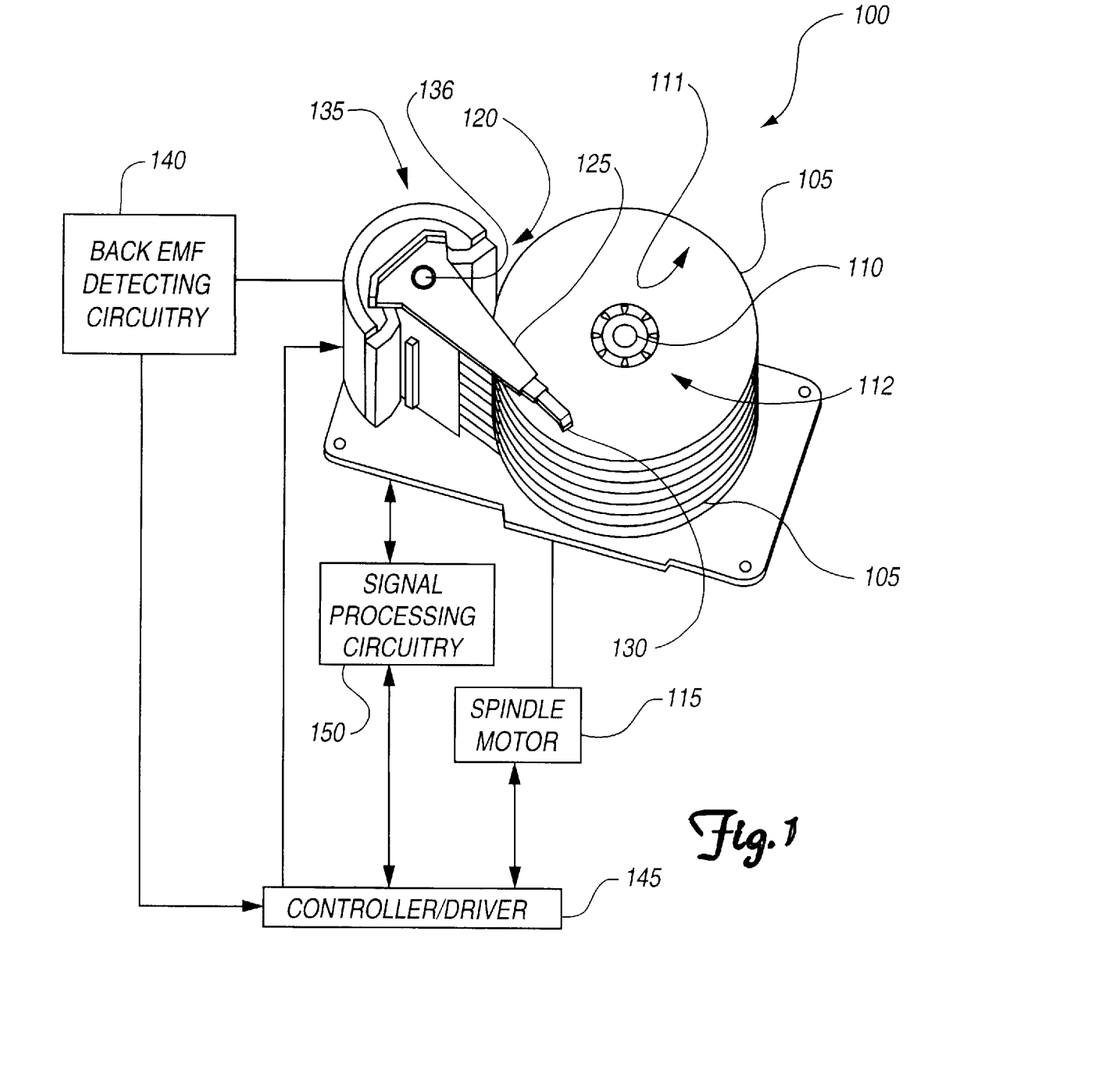
FIG. 1 is a diagrammatic view of disc drive 100 which is used in accordance with the present invention to burnish a surface of one or more discs to remove asperities from surfaces of the discs.

FIG. 1 is a diagrammatic view of disc drive data storage device 100 which is used in accordance with preferred methods of the present invention to reduce or eliminate asperities on the surfaces of the discs. Disc drive 100 includes one or more discs 105, hub or spindle 110, spindle motor 115, actuator assembly 120, heads 130, actuator motor 135, back EMF detection circuitry 140, controller/driver 145 and signal processing circuitry 150.

Each of discs 105 has an outer diameter 111 and an inner diameter 112. At inner diameter 112, each of discs 105 is mounted on spindle 110 to form a "disc stack." While at times the present invention is described herein with reference to a disc stack type drive, it is equally implementable using a single disc type drive. Further, while burnishing of the discs to remove asperities is preferably accomplished using the same disc drive with which the disc will operate in the field, a dedicated "burnishing" disc drive can be used interchangeably to burnish discs for eventual use with other disc drives. Spindle motor 115 is physically coupled to spindle 110 for causing rotation thereof. Controller 145 is electrically coupled to spindle motor 115 and provides control and/or drive signals for causing spindle motor 115 to rotate spindle 110 and discs 105 in a controlled manner. Controller 145 can also receive feedback signals (such as back EMF signals) from motor 115 to aid in controlling the spindle motor. As is discussed below in greater detail, the rate of disc rotation and the head position can be controlled in accordance with some embodiments of the present invention to maintain a substantially constant head linear velocity. This results in a relatively constant reduced head fly height. In some preferred embodiments, a head linear velocity relative to the spindle of less than 50 percent of the normal head linear velocity (i.e., a head linear velocity used to obtain a normal operational fly height) is used.

Each of heads 130 is physically coupled to the end of one of actuator arms 125 of actuator assembly 120. Typically, each actuator arm includes a number of components such as an E-block arm, a rigid support beam, and a gimbal/flexure assembly. Actuator motor 135 is coupled to actuator assembly 120 and causes actuator arms 125 and heads 130 to rotate about pivot 136. In this manner, heads 130 can be selectively moved across regions of the disc from outer diameter 111 toward inner diameter 112, and vice versa. While movement of heads 130 is discussed as being in a generally or substantially radially inward or outward direction, it should be noted that movement of heads 130 will not be completely linear or radial unless a linear actuator motor is used.

The most commonly used type of actuator motor is a rotary moving coil motor. Because of the low spindle speeds required to lower the head fly heights for burnishing the discs in accordance with the present invention, frame locking to servo data on the disc(s) may not be possible. Therefore, back EMF detection circuitry 140 is included to control actuator movement as is known in the art. Back EMF detecting circuitry 140 is electrically coupled to actuator motor 135 and to controller 145 and provides feedback or output signals to controller 145. Controller 145, which is electrically coupled to actuator motor 135, can control actuator motor 135 (and thus actuator and head movement) as a function of the output of back EMF detecting circuitry 140 during burnishing seek and return cycles as is discussed below in greater detail. However, other methods of controlling motor 135 can be used as well.

Controller 145 can be a microprocessor or other digital and/or analog control circuitry adapted for controlling spindle motor 115 and actuator motor 135 during low speed burnishing operations in accordance with the present invention. In other embodiments, instead of a single controller, separate controllers are used for controlling spindle motor 115 and actuator motor 135. Low speed burnishing can be implemented totally in servo firmware which is downloadable to controller 145. However, the actuator motor coil voltage and current values read by the firmware should be calibrated for the particular burnishing algorithm implementation. This calibration can be done by hand or automated. An alternative is to hand calibrate a limited number of PWA's (printed wiring assemblies or circuit boards) that would be attached to head/disc assemblies (HDA's) only for burnishing.

Signal processing circuitry 150 is electrically coupled between magnetic data heads 130 and controller 145. Circuitry 150 can be any combination of circuits and/or components necessary for driving the transducers in heads 130, for writing data to surfaces of discs 105 using heads 130, and for receiving and processing servo or user data read from discs 105 by heads 130.

Figure 2:
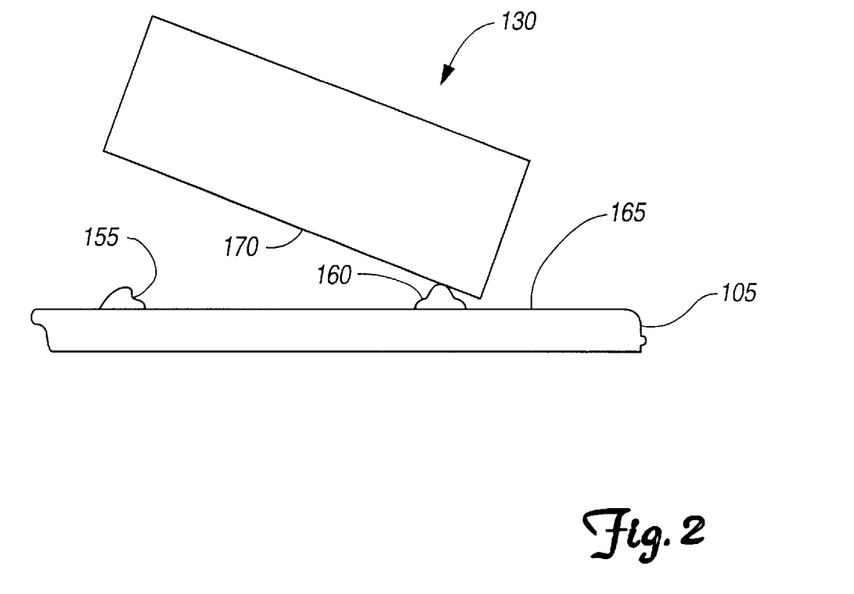
FIG. 2 is a diagrammatic side view of a portion of disc drive 100 which illustrates contact between a magnetic data head of the disc drive and asperities on a surface of one of the discs.

FIG. 2 is a side diagrammatic view of a single one of heads 130 "flying" above surface 165 of a corresponding one of discs 105 as the disc rotates. The fly height at which head 130 flies above surface 165 of disc 105 is dependent upon several factors. A primary factor in determining the fly height of head 130 above surface 165 is the speed at which disc 105 rotates. As shown, surface 165 of disc 105 includes asperities 155 and 160. Depending upon the fly height, as head 130 flies above surface 165 while disc 105 rotates, ABS 170 of head 130 repeatedly comes into physical contact with the asperities. The present invention includes methods of using the corresponding magnetic data head at a reduced fly height to burnish surface 165 of each disc 105 to eliminate and/or reduce the size of the asperities thereon.

Figure 3:
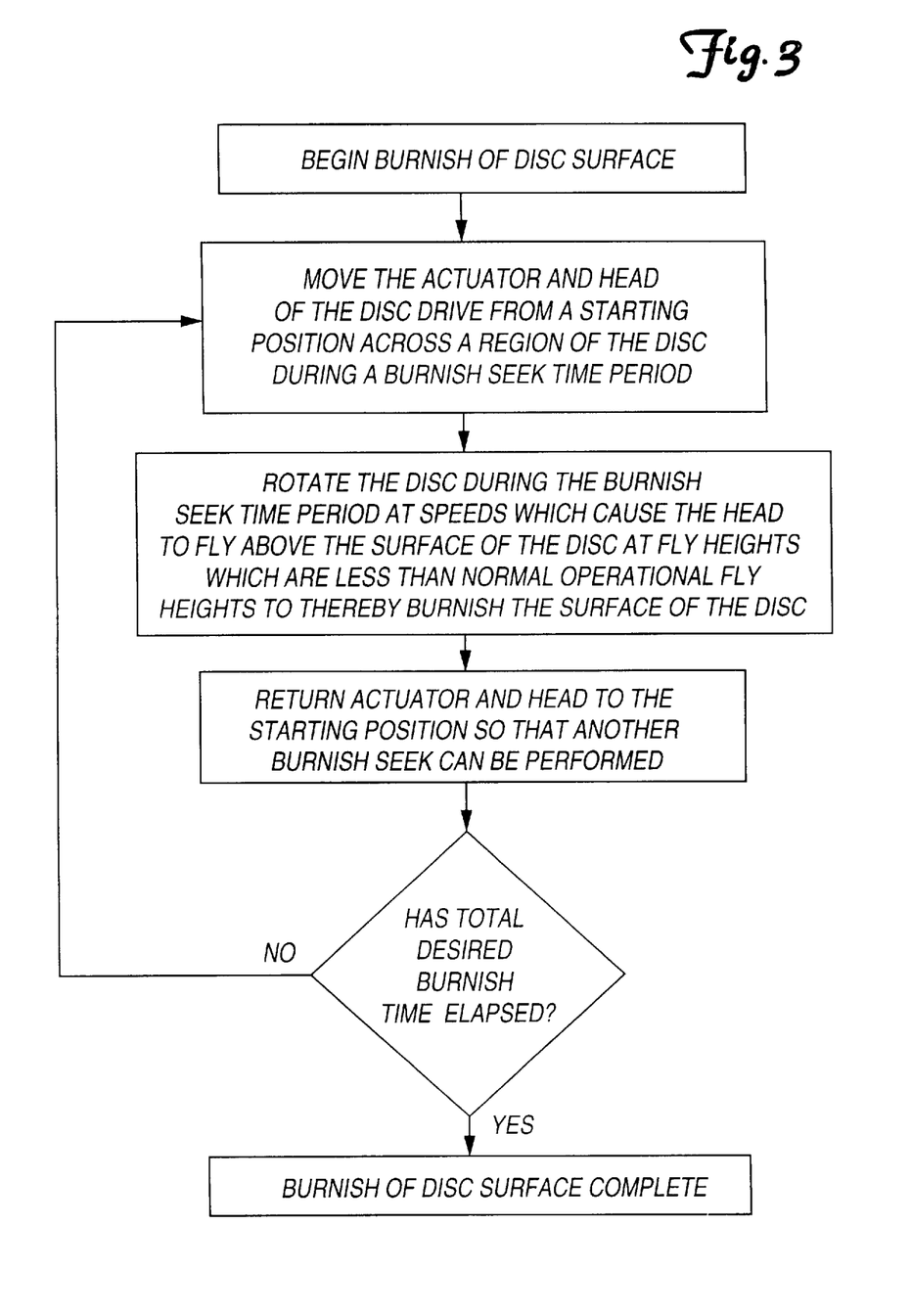
FIG. 3 is a flow diagram illustrating a first preferred method of the present invention.

A drive level method of burnishing the surface of each disc with the corresponding head to remove asperities (and the thermal asperities which result from head-to-asperity contact) is disclosed. FIG. 3 is a flow diagram which illustrates a first preferred method of burnishing the surface of a magnetic disc to remove and/or reduce the size of asperities on the surface in accordance with the present invention. The method illustrated in FIG. 3 uses the disc drive itself to burnish the surface of the magnetic disc. Specifically, preferred methods of the present invention use the magnetic data heads of the disc drive to burnish the surface of the magnetic disc. This eliminates the need for special disc burnishing machinery. However, in other embodiments or methods, a dedicated burnishing disc drive can be used such that discs are temporarily placed on the spindle of the dedicated disc drive for burnishing, but are subsequently removed so that other discs can be burnished to reduce the number of asperities. Once burnished the discs can be installed in other disc drives for conventional use.

According to preferred methods of the present invention such as illustrated in FIG. 3, actuator arm 125 and head 130 of a disc drive are moved, from a starting position, over a region of the disc during a "burnishing seek" time period. During the burnishing seek time period, the head can be moved from outer diameter 111 toward inner diameter 112, or vice versa. During the burnishing seek time period in which controller 145 controls actuator motor 135 to move head 130 across the desired region of the disc, spindle motor 115 is controlled such that disc 105 is rotated at reduced speeds which cause the head to fly above the surface of the disc at fly heights which are less than normal operational fly heights of the disc drive. The term "normal operational fly heights" is intended to represent fly heights of head 130 relative to surface 165 during operation of the disc drive in conventional read and/or write operations with the discs spinning at their desired or target speed. While different disc drives have different normal operational fly heights, all disc drives have fly heights which are less than the corresponding normal operational fly height and which can be implemented using a reduced rate of disc rotation.

In some preferred embodiments, the step of rotating the disc during the burnishing seek time period also includes controlling the spindle motor in order to control the rate of spindle rotation (and thus the rate of disc rotation) to maintain an approximately constant linear head velocity relative to the spindle. Also, the rate of rotation is preferably chosen to maintain reduced fly heights which are at least about 15 to 20 percent lower than the normal operational fly heights for the disc drive. In one preferred embodiment, burnishing fly heights are approximately 28 percent lower than normal operational fly heights. However, in other embodiments, fly height reductions of a higher percentage are preferred.

As discussed below in greater detail, in some preferred embodiments of the present invention, actuator motor 135 is controlled such that head 130 moves from the outer diameter toward the inner diameter at a substantially constant radially inward velocity in order to burnish the surface evenly. However, the radially inward velocity can be non-constant in other embodiments. As the head is slowly moved in a radially inward direction at the reduced fly heights, asperities on the surface of the disc repeatedly come into contact with the head and are reduced in size and/or eliminated.

After each "burnish seek" time period in which the head is moved slowly from the outer diameter (or starting position) toward the inner diameter (or across a region of the disc surface in general), actuator motor 135 is controlled by controller 145 to return the head back toward the outer diameter or starting position. This step can be referred to as a "burnish return." Return of the head toward the starting position on the disc can also be done at a low radial velocity and with reduced fly heights so that burnishing of the disc surface is accomplished during this burnish return time period as well. However, in some embodiments of the present invention, burnishing of the disc surface occurs only during the burnish seek time period and not during the burnishing return time period.

Figure 4A:
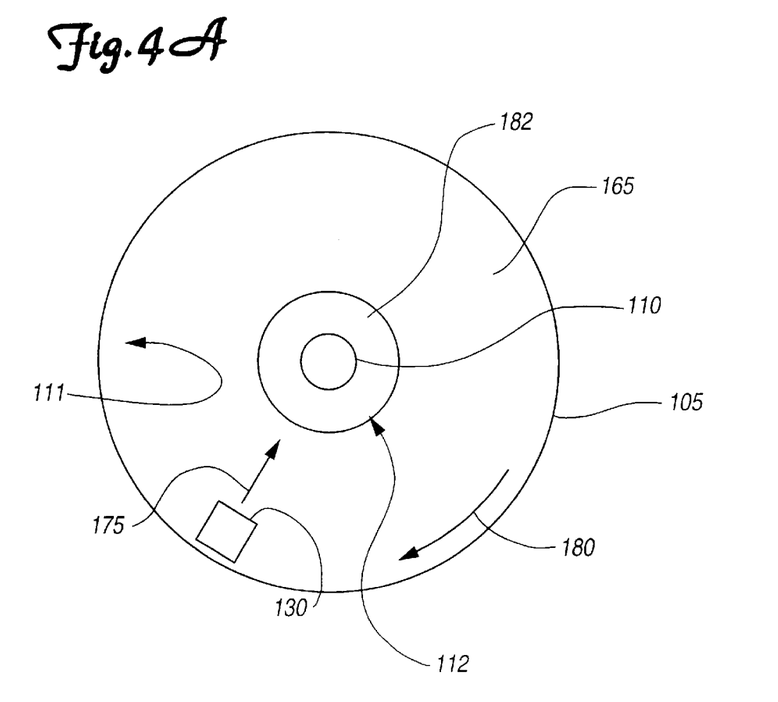
FIGS. 4A and 4B are top diagrammatic views of the data head flying above outer and inner diameters, respectively, of the disc surface during burnishing seek and return operations in accordance with the present invention.

FIG. 4A is a top diagrammatic view illustrating the position of head 130 at the beginning of a burnishing seek in an embodiment in which the starting point or position is near outer diameter 111 of disc 105. As disc 105 rotates in the clockwise direction represented by arrow 180, head 130 is slowly moved by controller 145 and actuator motor 135 in the radially inward direction represented by arrow 175. Preferably, controller 145 controls actuator motor 130 such that the radially inward velocity of head 130 is maintained either at a substantially constant value or between a predetermined range of values, during the entire burnish seek. Further, controller 145 preferably controls spindle motor 115 such that the head linear velocity relative to the spindle remains substantially constant or within a predetermined range, during the entire burnish seek period. Also, as discussed above, the rate of disc rotation is preferably controlled in order to maintain a reduced fly height, for example approximately 1.3 microinches, during the burnish seek while the head is slowly swept from outer diameter 111 toward inner diameter 112. Of course, depending on the values of the normal operation fly heights of a particular disc drive, the particular value of the reduced or burnish fly height will change as well. In general, the reduced fly heights will preferably be at least about 15 to 20 percent less than the normal operational fly heights. During a burnish seek, head 130 can travel the entire distance from outer diameter 111 to inner diameter 112 such that head 130 burnishes landing zone 182 as well. In the alternative, movement of head 130 can be controlled such that head 130 burnishes surface 165 of disc 105 up to, but not including, the position of landing zone 182.

Figure 4B:
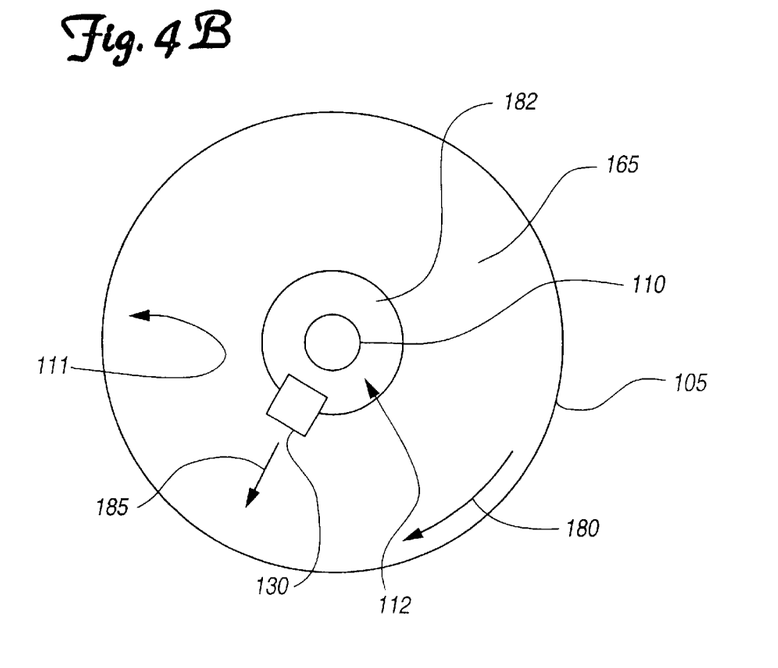

FIG. 4B is a top diagrammatic view illustrating a "burnish return" in accordance with the burnish seek illustrated in FIG. 4A. During the burnish return, movement of head 130 is controlled such that it travels in the radially outward direction represented by arrow 185. As discussed above, the radially outward velocity of head 130 during a burnish return is typically greater than the radially inward velocity of head 130 during a burnish seek. However, this need not be the case. After returning to outer diameter 111 during a burnish return, the disc drive is ready for the next burnish seek. As indicated in the flow diagram of FIG. 3, after each burnish seek/burnish return combination, a decision can be made as to whether the total desired burnish time has elapsed. As is discussed below in greater detail, burnish times of at least about 15 minutes are preferred. In some preferred embodiments, the total desired burnish time is between approximately 30 minutes and approximately 90 minutes.

During testing, burnishing was preformed by reducing the head fly height to approximately 1.3 microinches (an approximately 28% reduction from the normal operational fly height) while slowly sweeping the heads from the stop at outer diameter 111 (i.e., the OD stop) to the stop at inner diameter 112 (i.e., the ID stop), repeatedly, for a period of time ranging from 15 minutes to 1 hour. Fly height was reduced by slowing the spindle to rotational speeds in the range of 872 to 2007 RPM, such that the linear velocity of the spindle relative to the heads was kept relatively constant at 165 inches per second.

All head/disc assemblies (HDA's) were tested by repeatedly burnishing them for time periods of 15 minutes or 30 minutes, using a common drive PWA. HDA's were positioned on their side and oriented with the positive X axis pointing up. Testing was performed at normal ambient lab temperature and pressure. Burnishing was performed using a slow constant velocity (typically 1.88 ips) inward movement of the actuator from the OD stop to the ID stop, while the spindle speed was increased as rapidly as possible from 872 to 2007 RPM to maintain the desired head linear velocity of 165 ips. This "burnish seek" typically required 0.6 second to complete.

Each burnish seek was immediately followed by a burnish return period of about 10.4 seconds, during which the actuator moved back to the OD stop (typically at a constant velocity of 4.85 ips) and waited while the spindle speed coasted back to 872 RPM. Once spindle speed reached 872 RPM, another burnish seek would immediately start, and the cycle would repeat. Thus, one burnish seek would occur every 11 seconds during the testing.

The low spindle speed required to lower the head fly height for burnishing prevents frame locking to the servo data. Thus, in place of servo data, actuator movement during the burnishing seek and the return seek was controlled by sensing the actuator back-EMF. Thus, servo data was not used at all by the special servo firmware. Using this technique, burnishing can be performed even before servo track writing. Actuator movement was velocity controlled by controller 145 using a PI control algorithm based on feedback of actuator motor back-EMF. Resistance of the actuator coils was recalculated before every burnish seek to improve accuracy by adjusting for the effect of coil heating.

The tables shown in FIGS. 5–8 detail the results of burnishing head disc assemblies (HDA's) in terms of changes in the number and type of thermal asperities (TA's). In the tables, "TA type" refers to the absolute read signal amplitude measured by the TAD tester in manufacturing. Type-1 refers to a TA with an amplitude of greater than or equal to 250 mv and less than 500 mv. Type-2 refers to a TA with an amplitude of greater than or equal to 500 mv.

Figure 5:
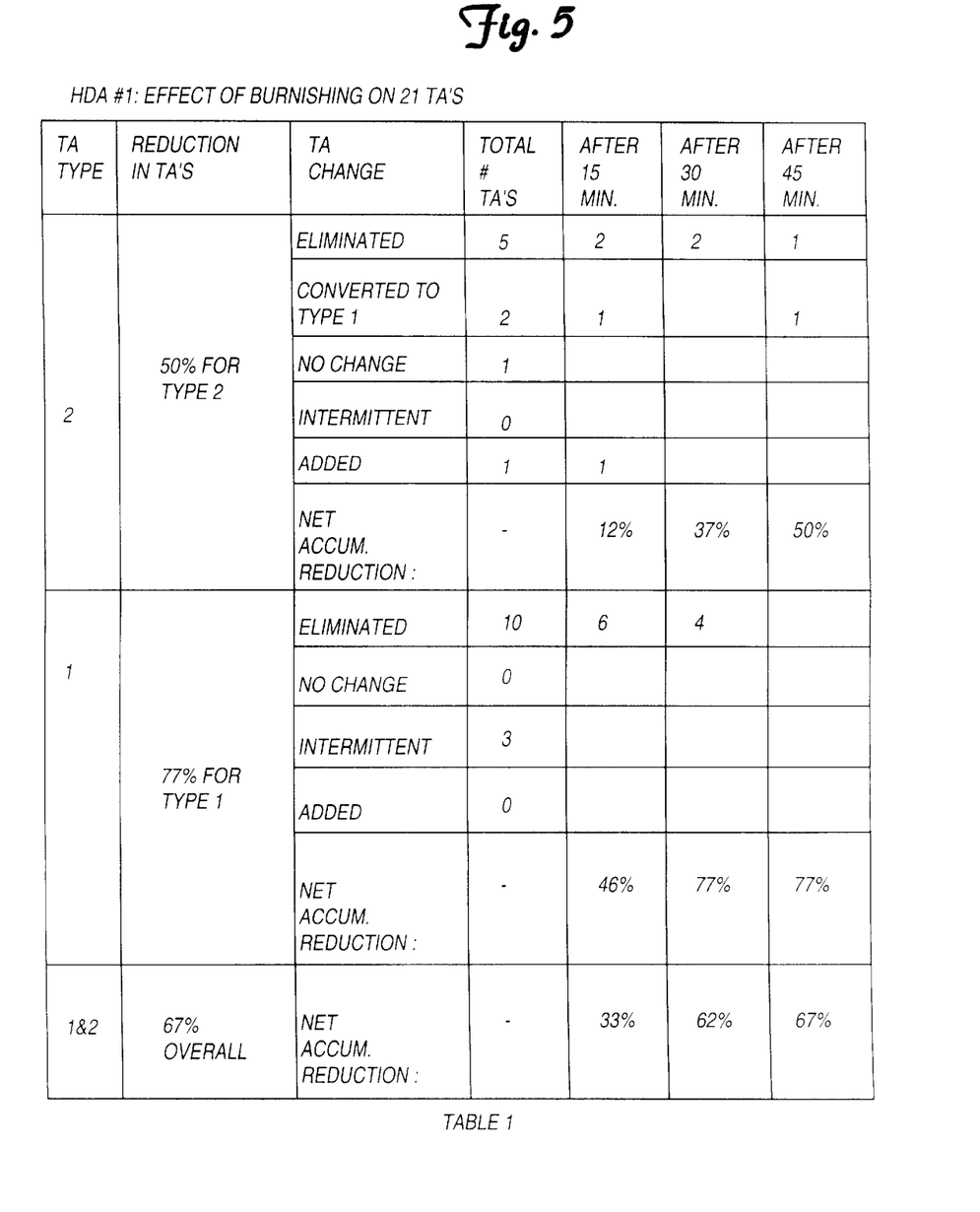
FIGS. 5–8 are tables of data which illustrate test results from the burnishing of 4 head/disc assemblies (HDA's), demonstrating the usefulness of the present invention in reducing or eliminating asperities on disc surfaces.

The table in FIG. 5 illustrates the results of burnishing a first test disc drive (HDA #1) which originally had 21 TA's on its surfaces. As can be seen from Table 1, after 15 minutes of burnishing, two type-2 TA's were eliminated and an additional type-2 TA was a converted to a type-1 TA. Also, one type-2 TA was added. Thus, after 15 minutes, there was a net reduction in the number of type 2-TA's of approximately 12 percent. After 30 minutes, two additional type-2 TA's were eliminated, for a net reduction of 37 percent. After 45 minutes of burnishing, one additional type-2 TA was eliminated, and one additional type-2 TA was converted to a type-1 TA. Thus, the total reduction in type-2 TA's for the first disc was 50 percent.

For the first test disc drive (HDA #1), a 77 percent overall reduction in type-1 TA's was achieved. As can be seen in the table illustrated in FIG. 5, after 15 minutes of burnishing six type-1 TA's were eliminated. After 30 minutes of burnishing, an additional four type-TA's were eliminated, bringing the total type-1 TA's eliminated after 30 minutes to ten. Thus, for all TA's (i.e., either type-1 or type-2), a 67 percent overall reduction was achieved.

Figure 6:
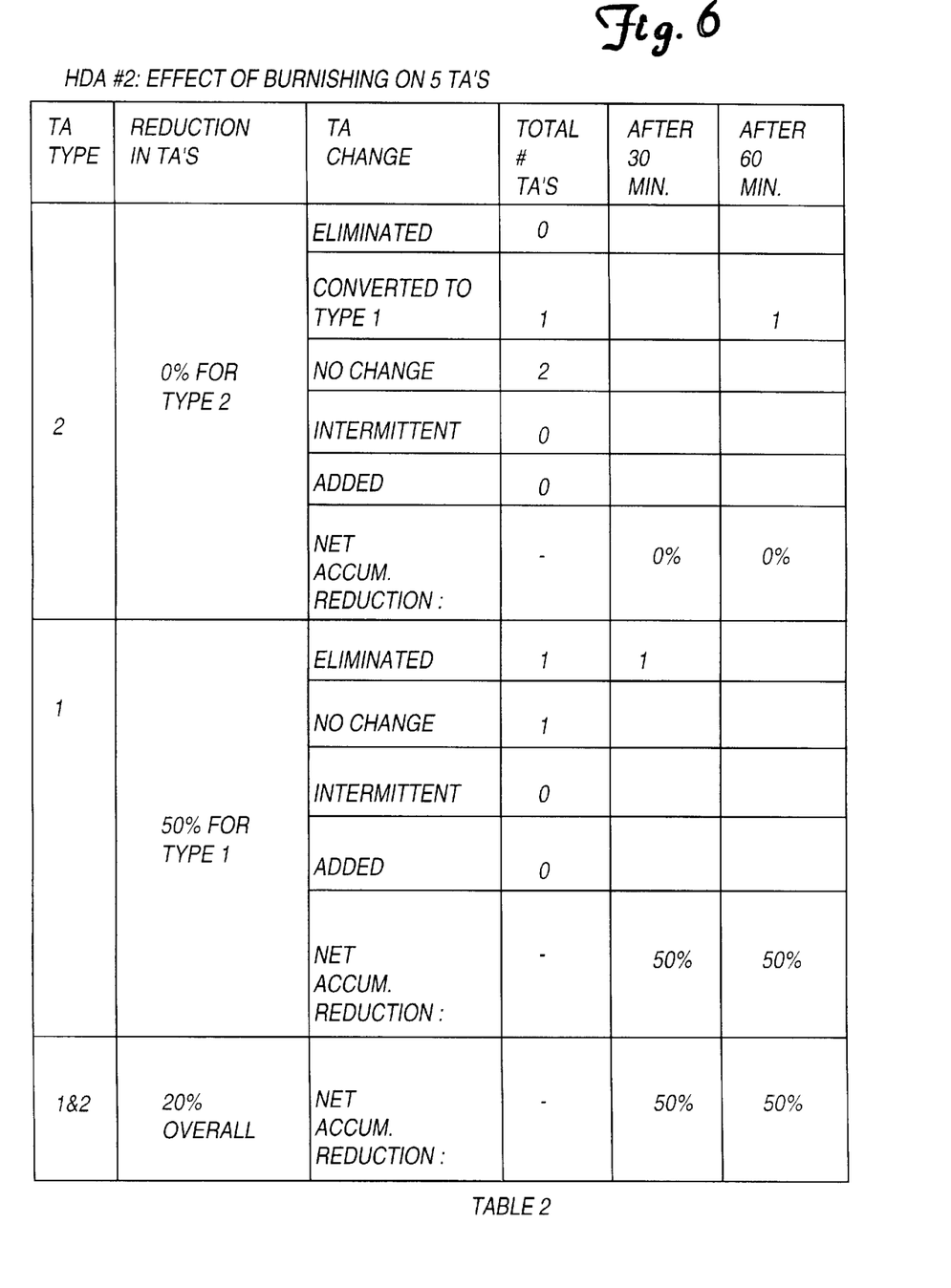

The table in FIG. 6 illustrates the results of burnishing a second test disc drive (HDA #2) in accordance with the present invention. For the second test disc, no elimination of type-2 TA's was achieved. However, one type-2 TA was converted to a type-1 TA after 60 minutes of burnishing. The one type-1 TA eliminated after 30 minutes of burnishing produced an overall reduction of type-1 TA's of 50 percent. Thus, the overall reduction in all types of TA's was 20 percent.

Figure 7:
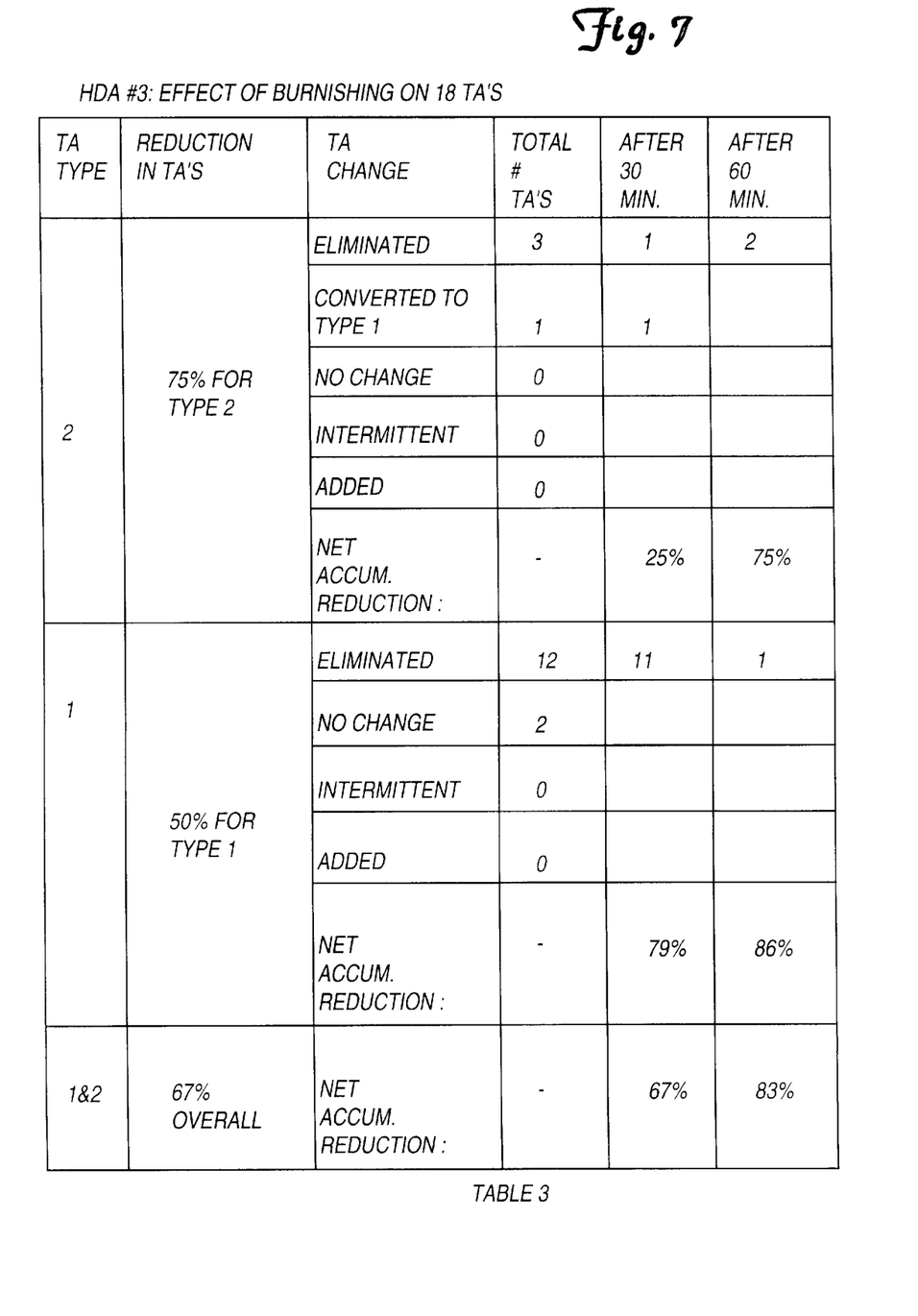

The table in FIG. 7 illustrates the results of burnishing a third test disc drive (HDA #3) in accordance with the present invention. As illustrated in FIG. 7, after 30 minutes, one type-2 TA was eliminated, and one type-2 TA was converted to a type-1 TA. Thus after 30 minutes, a 25 percent reduction in type-2 TA's was achieved. During the same 30 minute time period, eleven type-1 TA's were eliminated, resulting in a 79% reduction in type-1 TA's and a 67% reduction in all TA's within the first 30 minutes. After 60 minutes, two additional type-2 TA's were eliminated, resulting in 75% total reduction of type-2 TA's. Also within the 60 minutes burnishing time period, one additional type-1 TA was eliminated, resulting in an 86 percent total reduction of type-1 TA's and an 83% reduction of all types of TA's during this time period.

Figure 8:
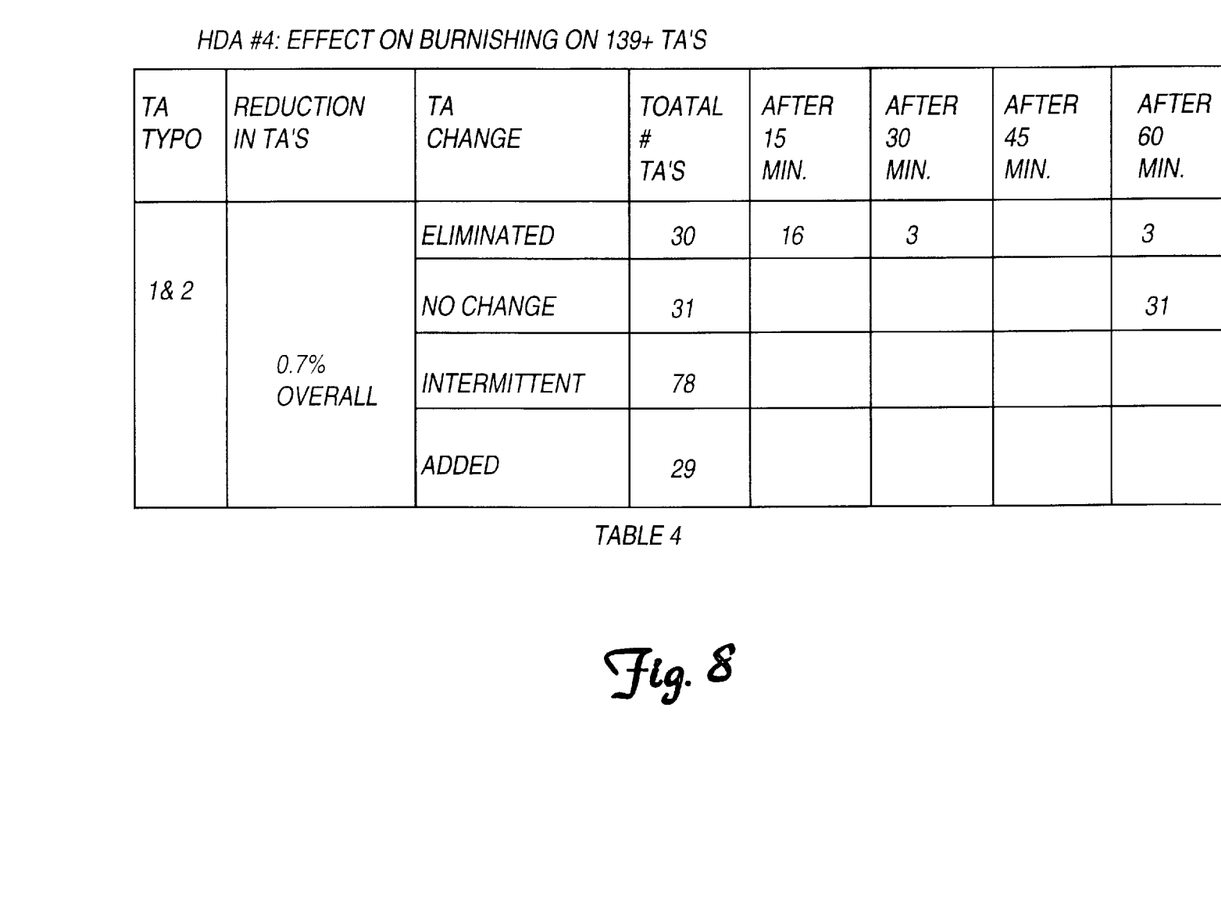

The table in FIG. 8 illustrates the results of burnishing on a fourth test disc drive (HDA #4) in accordance with the present invention. On this fourth test disc drive, 16 TA's (both type-1 and type-2 combined) were eliminated after 15 minutes, and an additional three TA's were eliminated after each of 30 minutes and 60 minutes of total elapsed burnish time. Thus, a total of 30 TA's were eliminated during the burnishing. However, 31 TA's exhibited no change, while an additional 78 TA's were intermittent. Also, 29 TA's were added during the burnishing process, resulting in a net reduction of TA's of only 0.7 percent.

Figure 9:
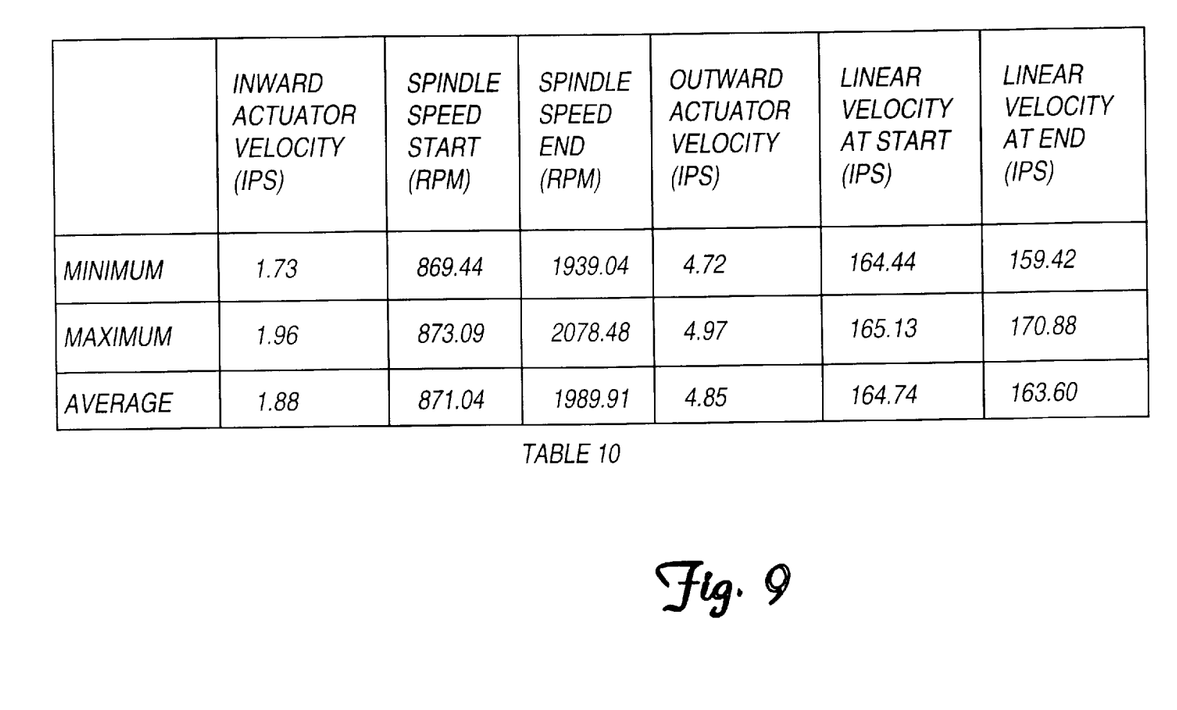
FIG. 9 is a table illustrating the head linear velocity relative to the spindle during burnish seek operations of the present invention.

Burnishing performance was monitored while testing each HDA to determine whether the test objective of burnishing at a head fly height of 1.3 microinches was being met, as measured by a nominal head linear velocity of 165 ips. Data was recorded by the servo firmware during each burnish seek and return seek to permit later calculation of average actuator seek velocity, and spindle speed and head linear velocity at the start and end of each burnish seek. The table in FIG. 9 shows minimum, maximum and average statistics for these values from one test period of one HDA, that are representative of all of the testing.

Figure 10:
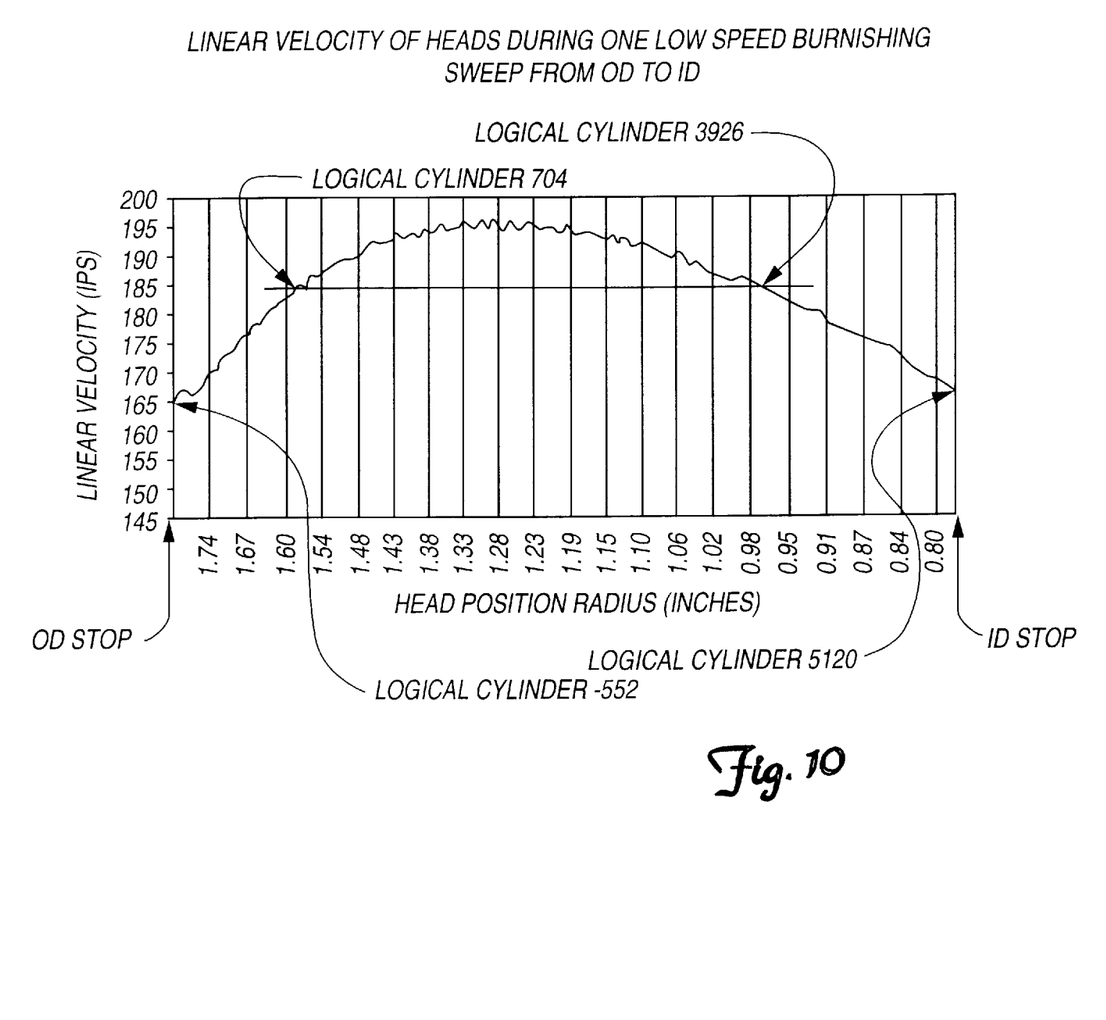
FIG. 10 is a plot of head linear velocity versus head position radius during one low speed spindle sweep from the outer diameter of a disc to the inner diameter of the disc.

This table shows that the head linear velocity objective of 165 ips was essentially met at the start and end of the burnish seeks. However, spindle speed data taken throughout the burnish seek shows that head linear velocity varied from 165 to 195 ips during the middle of the seek, as shown in the graph of FIG. 10.

There was an initial concern that burnishing would be inadequate at the head linear velocity of 195 ips because fly height would be higher. However, the large number of TA's eliminated by burnishing cylinders in the range 704 to 3926, which corresponds to the linear velocity range 185 to 195 ips (region above the horizontal line in the graph), indicates this is not a problem.

Figure 11:
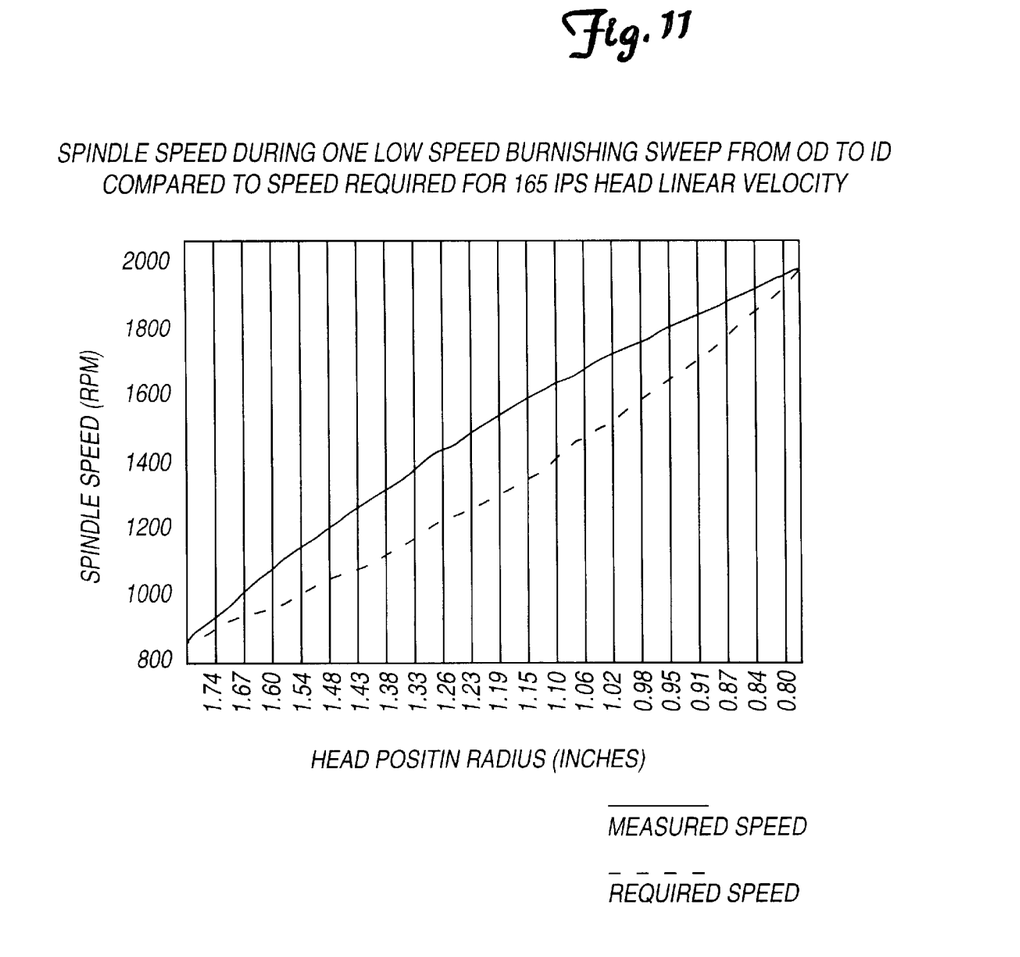
FIG. 11 is a plot of profiled spindle speed versus head position radius which can be used to maintain a head linear velocity of 165 inches per second during a burnishing sweep from the outer diameter to the inner diameter in accordance with some embodiments of the present invention.
Figure 12:
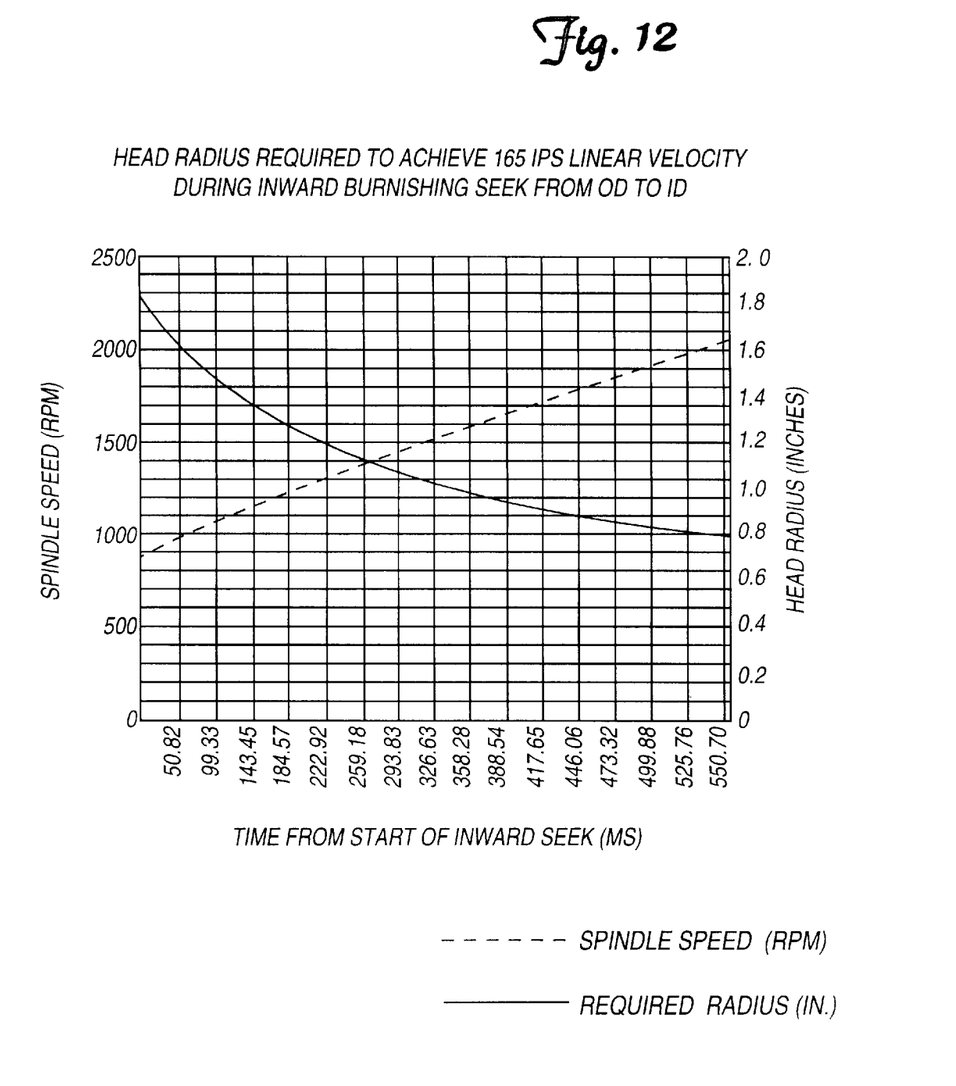
FIG. 12 is a plot illustrating actuator velocity profiling (head radius versus time) which can be used to maintain a head linear velocity of 165 inches per second during a burnishing sweep from the outer diameter to the inner diameter in accordance with some preferred embodiments of the present invention.

If it is desirable to make head linear velocity more constant during the burnish seek, then it can be accomplished by either profiling the spindle speed or the actuator velocity during the burnish seek as shown in the graphs of FIGS. 11 and 12. The best alternative for making head linear velocity relative to the spindle more constant is to profile actuator velocity during the burnish seek, because of the typically higher bandwidth of the actuator control system as compared to the spindle motor control system. This would require changing actuator velocity during the seek so that actuator position matches the radius curve in the graph of FIG. 12.

The burnishing during testing was preformed over the entire disc, from the OD stop to the ID stop, and thus included the laser zone texture in landing zone 182, which has peaks that rise 0.8 microinches above the mean disc surface. There was some concern that burnishing over the textured area would damage the heads or the textured area, and should thus be avoided. However, tests indicate that significant damage to the heads and textured area did not occur.

Burnishing the textured area can be avoided by deadreckoning, based on time from the point of leaving the OD stop, to terminate the burnish seek and initiate the burnish return. This "seek reversal time" could be set such that the textured area is not burnished, although the positional accuracy appears to be about +4% to -8% due to variations in actuator velocity. Given the small radial size of the textured area, using this mode to avoid the textured area would require either not burnishing some of the data surface, or improving the positional accuracy.

Although the present invention has been described with reference to preferred embodiments, workers skilled in the art will recognize that changes may be made in form and detail without departing from the spirit and scope of the invention. For example, while specific reduced fly height values were used by way of example for a particular disc drive, it is clear that the preferred values of the reduced fly heights will be dependent upon the particular characteristics of different types of disc drives. Also, the burnishing starting position need not be the outer or inner diameters of the disc, but rather, it can be any location on the disc.

What is claimed is:

1. A method of burnishing a surface of a magnetic disc of a disc drive, the disc drive having a magnetic data head and an actuator coupled to the head for supporting the head as the head flies above the surface of the disc, the method comprising:

rotating the disc at rates of rotation which will result in burnishing head fly heights which are less than a normal operational head fly height of the head;

controlling the actuator to thereby repeatedly move the head across a region of the disc in a generally radial direction during a burnishing time period, wherein the head flies above the surface of the disc at the burnishing fly heights during the burnishing moving the actuator and the head relative to the disc surface with an actuator motor wherein actuator motor back electromotive force (EMF) is sensed during the burnishing time period to control the actuator as a function of the sensed actuator motor back EMF.

2. The method of claim 1, wherein controlling the actuator to thereby repeatedly move the head across the region of the disc in the generally radial direction further comprises controlling the actuator to move the head across the region of the disc at a substantially constant radial velocity.

3. The method of claim 2, wherein the disc is coupled to a spindle and the disc is rotated by rotating the spindle, the method further comprising controlling the rate of spindle rotation to maintain a head linear velocity relative to the spindle of less than about 50 percent of a normal head linear velocity relative to the spindle associated with the normal operational fly height of the head.

4. The method of claim 1, wherein controlling the actuator to thereby repeatedly move the head across the region of the disc further comprises controlling the actuator to thereby repeatedly move the head from an outer diameter of the disc toward the inner diameter of the disc.

5. The method of claim 1, wherein controlling the actuator to thereby repeatedly move the head across the region of the disc further comprises controlling the actuator to thereby repeatedly move the head from an inner diameter of the disc toward an outer diameter of the disc.

6. The method of claim 1, wherein the burnishing time period is at least about 15 minutes.

7. The method of claim 6, wherein the burnishing time period is at least about 30 minutes.

8. The method of claim 7, wherein the burnishing time period is between about 30 minutes and about 60 minutes.

9. The method of claim 1, wherein the burnishing head fly heights are less than about 85 percent of the normal operational fly heights.

10. A method of reducing asperities on a surface of a magnetic disc of a disc drive, the method comprising:

controlling an actuator motor of the disc drive to thereby move an actuator and a head coupled to the actuator from a starting position comprising a track of maximum radius on the disc surface, inwardly across a region of the disc;

controlling a spindle motor of the disc drive to thereby increase rates of rotation of the disc as the actuator motor moves the actuator and the head inwardly across the region of the disc, wherein the rates of rotation of the disc are controlled as the head moves across the region of the disc such that the head flies above the surface of the disc at fly heights which are less than normal operational fly heights of the head; and repeating the steps of controlling the actuator motor and controlling the spindle motor during a first time period to thereby further burnish the surface of the disc to reduce asperities thereon.

11. The method of claim 10, and after the step of controlling the actuator motor to thereby move the actuator and the head across the region of the disc, further comprising the step of controlling the actuator motor to thereby return the actuator and the head to the starting position.

12. The method of claim 10, wherein the first time period is at least about 15 minutes in duration.

13. The method of claim 12, wherein the first time period is between about 30 and about 90 minutes in duration.

14. The method of claim 12, wherein controlling the actuator motor of the disc drive to thereby move the actuator and the head across the region of the disc further comprises controlling the actuator motor to thereby move the head across the region of the disc at a substantially constant radial velocity.

15. The method of claim 12, wherein the fly heights of the head as the head is moved across the region of the disc are less than about 85% of the normal operational fly heights.

16. An apparatus for reducing asperities on a surface of a magnetic disc, comprising:

a spindle on which the disc is mounted at an inner diameter of the disc;

a spindle motor coupled to the spindle for rotating the spindle and the disc;

a magnetic data head;

an actuator coupled to the magnetic data head for supporting the magnetic data head as it flies above the surface of the disc;

an actuator motor coupled to the actuator for moving the actuator to thereby move the magnetic data head from a starting position across a region of the disc;

an actuator motor controller coupled to the actuator motor and operatively configured to control the actuator motor to thereby repeatedly move the actuator and the magnetic data head across the region of the disc, from the starting position at a radially inward velocity of greater than about 1.8 inches per second, during a burnishing time period; and a spindle motor controller coupled to the spindle motor and adapted for controlling the spindle motor during the burnishing time period to thereby control rates of rotation of the disc as the actuator motor is controlled to repeatedly move the actuator and the magnetic data head across the region of the disc, wherein the rates of rotation of the disc are controlled as the head moves across the region of the disc such that the head flies above the surface of the disc at fly heights which are at least about 15 percent less than normal operational fly heights of the head so that the magnetic data head burnishes the surface of the disc during the burnishing time period to thereby reduce asperities thereon.

* * * * *